United States Patent [19]
Yang

[11] Patent Number: 5,233,721
[45] Date of Patent: Aug. 10, 1993

[54] FOLDABLE, ADJUSTABLE LENGTH WINDSHIELD WIPER FRAME STRUCTURE

[76] Inventor: Ming-Tung Yang, No. 4-3, Lane 97, Lung Chuan St., Panchiao, Taipei Hsien, Taiwan

[21] Appl. No.: 900,459

[22] Filed: Jun. 18, 1992

[51] Int. Cl.$^5$ .............................. B60S 1/38; B60S 1/28
[52] U.S. Cl. ................. 15/250.39; 15/250.41; 15/250.42
[58] Field of Search .......... 15/250.41, 250.42, 250.39, 15/250.13, 250.31, 250.36, 250.23

[56] References Cited

U.S. PATENT DOCUMENTS

| | | | |
|---|---|---|---|
| 3,846,864 | 11/1974 | Baut et al. | 15/250.42 |
| 3,922,749 | 12/1975 | Castleman, Jr. et al. | 15/250.42 |
| 3,969,784 | 7/1926 | Journée | 15/250.42 |
| 4,547,925 | 10/1985 | Blackborow et al. | 15/250.42 |

FOREIGN PATENT DOCUMENTS

| | | | |
|---|---|---|---|
| 681957 | 10/1952 | United Kingdom | 15/250.42 |
| 803324 | 10/1958 | United Kingdom | 15/250.42 |
| 2120927 | 12/1983 | United Kingdom | 15/250.42 |

*Primary Examiner*—Harvey C. Hornsby
*Assistant Examiner*—Gary K. Graham
*Attorney, Agent, or Firm*—Bacon & Thomas

[57] ABSTRACT

A windshield wiper frame structure is disclosed in which the wiper frame structure can be folded and its length adjusted to multiple sizes. A main frame has hinged portions which enable the main frame to be compactly folded for storage and transportation. In use, links, which support a pair of wiper blades are adjustably attached to the main frame to permit adjustment of the wiper structure length. Additional adjustment may be provided by adjustably attaching blade holders to each link.

4 Claims, 5 Drawing Sheets

FOLDABLE, ADJUSTABLE LENGTH WINDSHIELD WIPER FRAME STRUCTURE

BACKGROUND OF THE INVENTION

The windshield wiper products currently circulating in the market as shown on FIG. 1 have sundry types and models, but the majority of them are confined to a standard mechanism wherein main member (1) is attached to link (2) through lock notch (11) and collar (4). Link (2) is connected to strip holder (3) and scrubber strips (5) are inserted into clamping devices (31) to clamp them to the strip holder (3) to complete the wiper assembly. However, the wiper size may vary with different brands of cars. So, if we use the common method to assemble the wiper mechanism, we require many different sizes of molds to manufacture wiper frame mechanisms. Doubtlessly, the mold cost for each size wiper product is increased sharply and its cost-effectiveness is diminished. Also, these known types of wiper products have inconveniences in packing and transportation as a result of their too slender and unvarying long strip mechanisms. Furthermore, consumers have difficulties in finding a suitable place inside the car for storage purposes. These inadequacies encountered during utilization, transportation and storage depreciate the performance of the known device.

SUMMARY OF THE INVENTION

A windshield wiper frame structure is disclosed which can be folded and shortened to adjust its length so that the wiper's scrubbing and cleaning sector area can be freely manipulated. A main member of the wiper frame is constructed by right and left links which are linked by hinges and fasteners so that main member can be folded to shorten its length. Also, sets of lock notches are arrayed and installed at intervals along the bottom edges of the main member and links to so that the links and strip holder can be properly secured a desired lock notch. Scrubber strips can be placed into clamping devices and retained by the clamp. An overlapped assembly is formed when left and right scrubber strips are conjoined together. The mechanism can be folded when left and right scrubber strips are conjoined together. The mechanism can be folded to shorten the length and adjusted to freely manipulate the desired scrubbing length.

DETAILED DESCRIPTION OF THE PREFERRED EMBODIMENT

Figure 1:
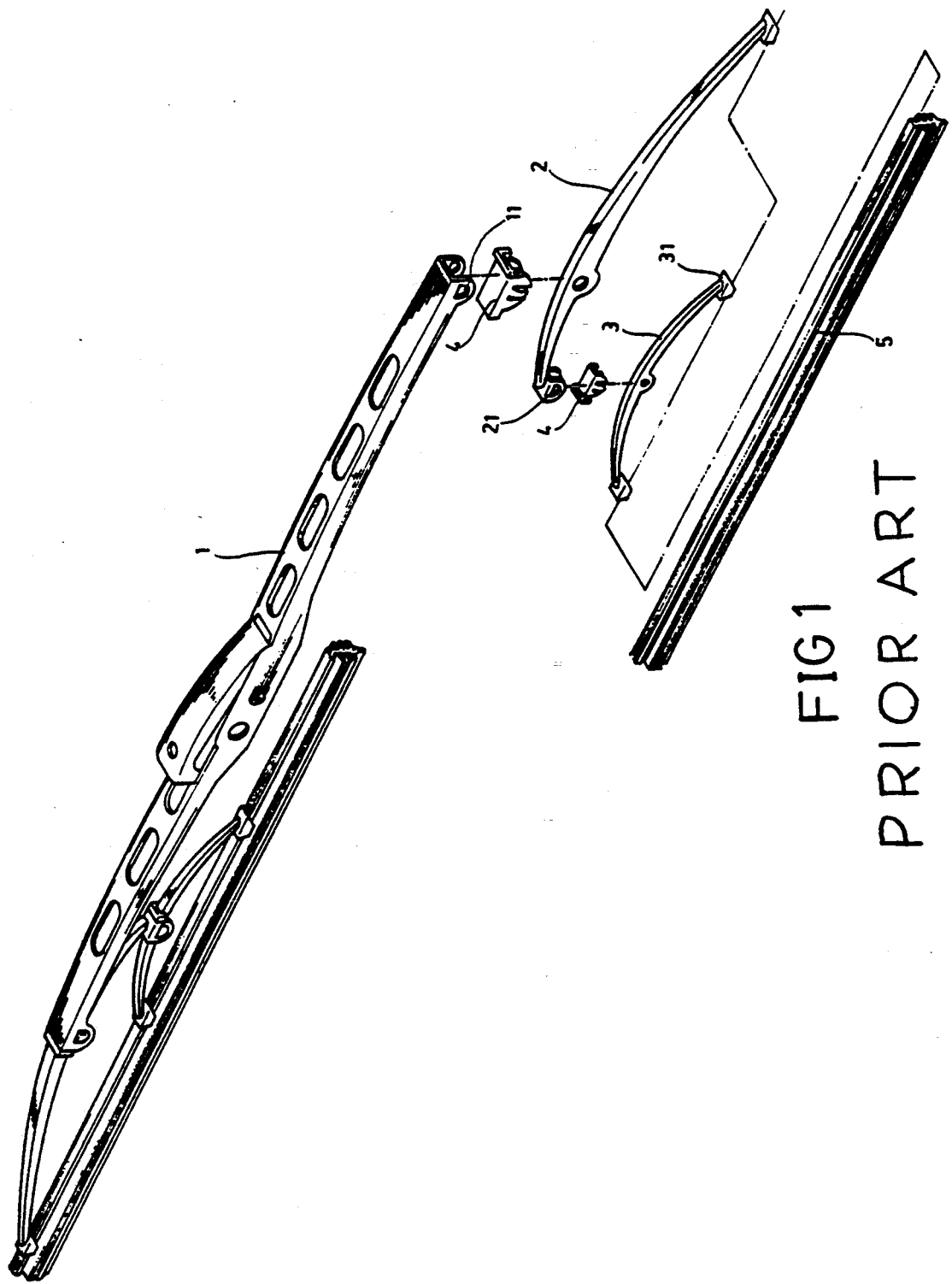
FIG. 1 is an exploded perspective view of a known windshield wiper mechanism.
Figure 2:
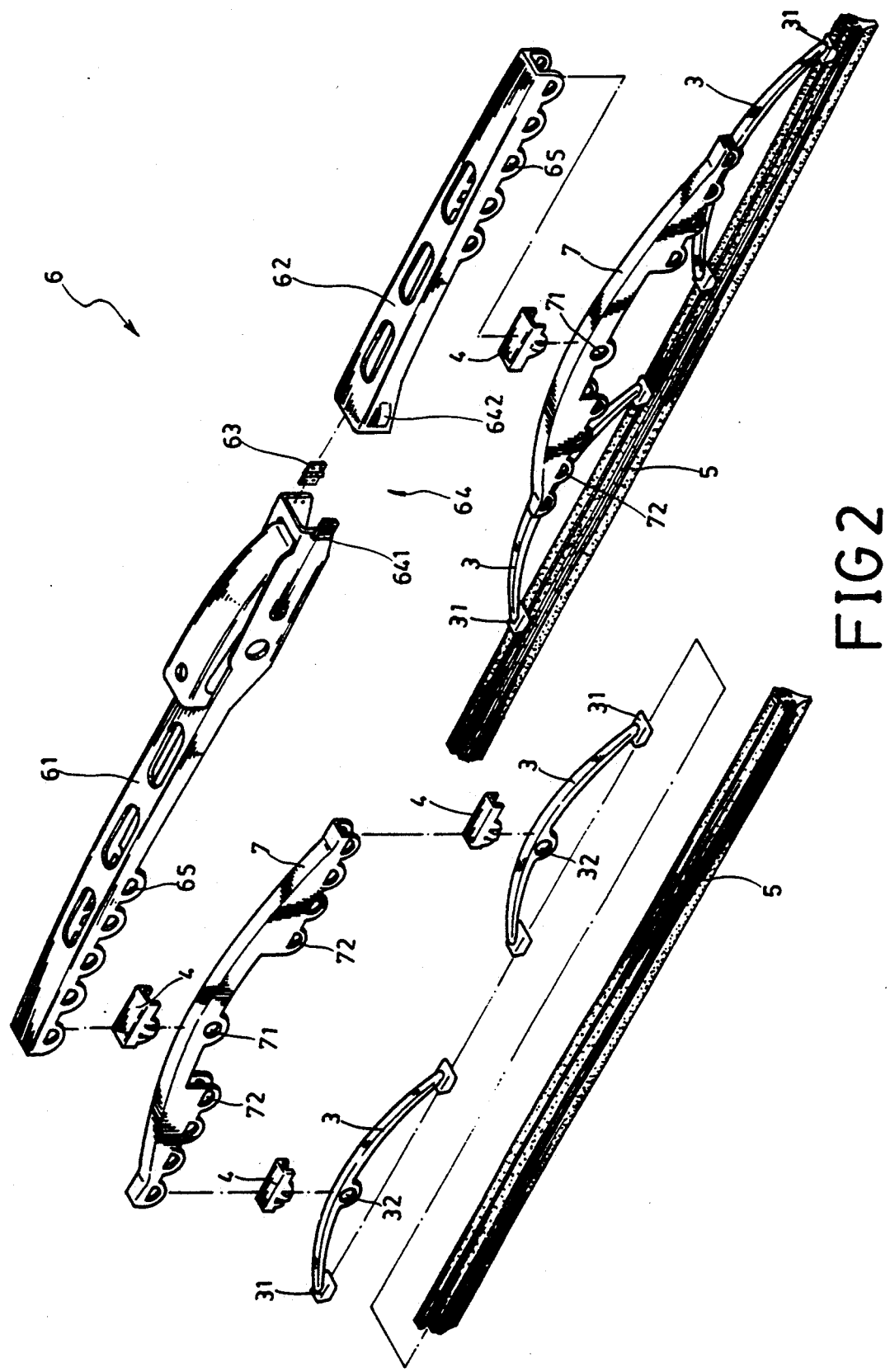
FIG. 2 is an exploded perspective view of a windshield wiper according to the present invention.
Figure 3:
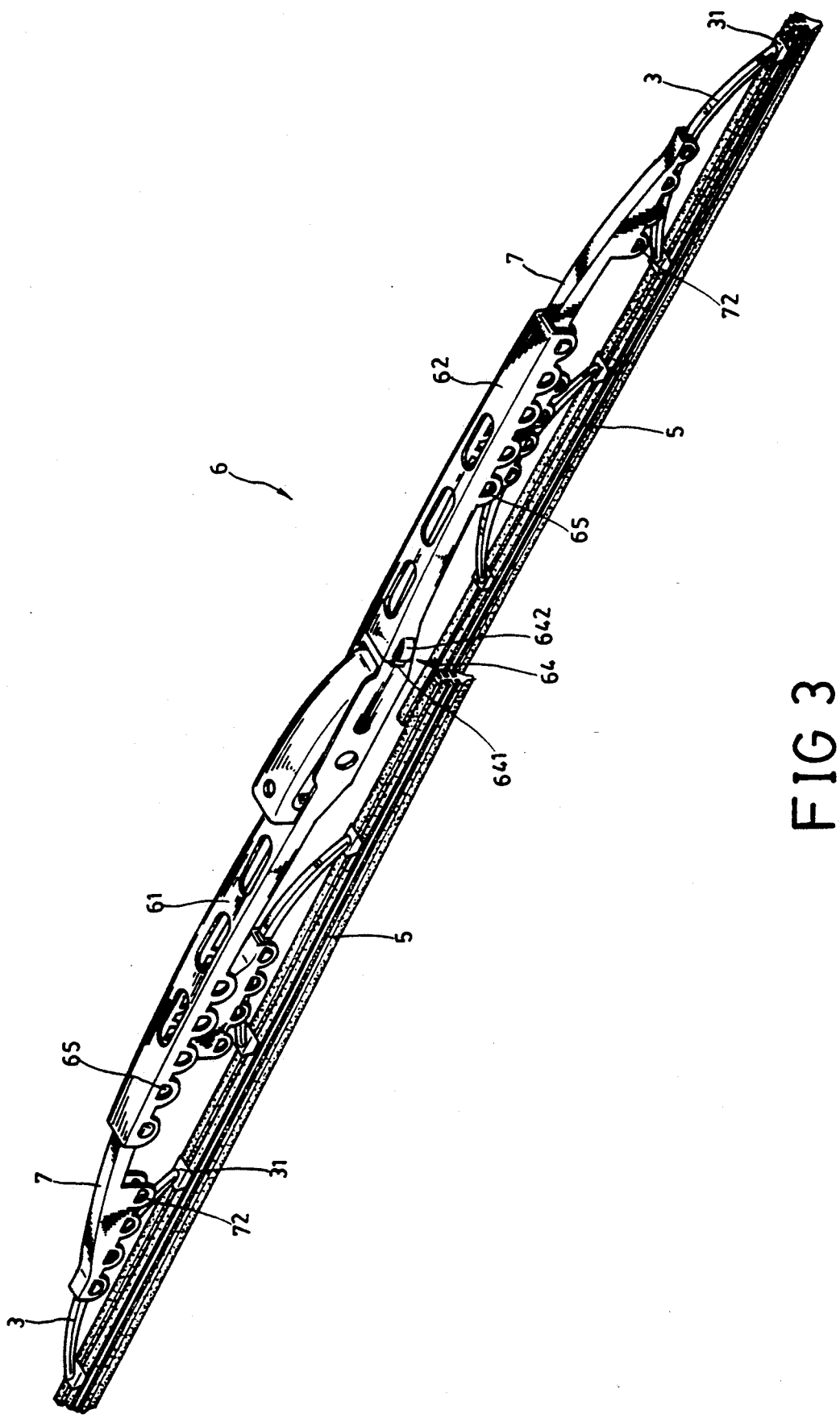
FIG. 3 is a perspective view of the wiper mechanism shown in FIG. 2.

Please refer to FIG. 2 and 3, which are disassembled and assembled perspective views of this invention. This invention is an improved wiper frame structure which includes main member (6), links (7) with strip holders (3) and two scrubber strips (5). The main member (6) is constructed by left link member (61) and right link member (62) as a separate mechanism which are attached at (64) by a hinge (63) so that link members 61 and 62 can be folded. Attachment (64) has male clip (641) and female clip (642) individually installed on the same side of the two folded link members (61) and (62). They can firmly secure the link members together after they are positioned straight. The two link members may easily be folded or shortened by gently pulling female clip (642) to release it from male clip (641). A complex set of lock notches (65) are arrayed at intervals along the bottom edge surface of left link member (61) and right link member (62). The intervals between the lock notches are dependent upon a particular wiper's desired size and length. A set of correlated collar holes (71) are formed in the middle section of the links (7) in order to attach collar (4) which is, in turn, connected to link member (61) lock notch (65); also, sets of lock notches (72) are arrayed along link (71) bottom edges surface by size intervals where their intervals are dependent upon a particular wiper's desired length and size.

Figure 4:
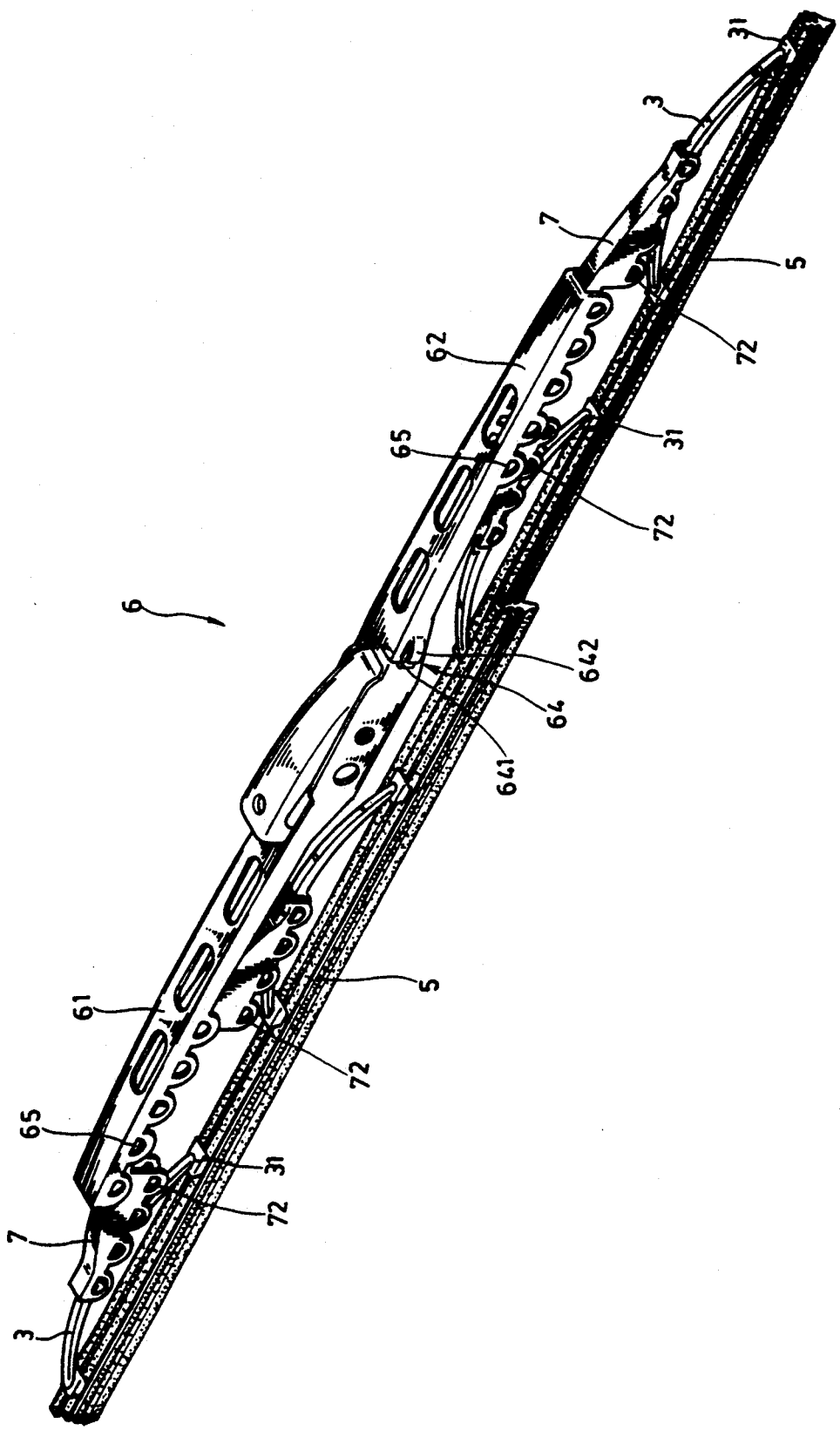
FIG. 4 is a perspective view of the wiper mechanism of FIG. 3 with the length shortened.

Strip holders (3) provide clamping devices (31) for holding scrubber strips (50) and define collar holes (32) in a middle section for connecting via collar (4) to any lock notch (72) located in link (7). An integrated structure assembly incorporates left ink member (61), right link member (62), links (7) and strip holders (3). Left link member (61) and right link member (62) are attached by hinge (63) and fasteners (64) to construct the main member (6). Strip holders (3) are assembled to proper lock notches (72) located at link (7) as per the desired size. Links (7) are assembled to proper lock notches (65) positioned in left link member (61) and right link member (62) per the desired wiper size. Scrubber strips (5) are inserted into the clamping device (31) of strip holder (3) located at bottom edge of left and right link members (61 and 62) respectively such that the two scrubber strips (5) are overlapping. In case a different size of wiper mechanism is required, the operation is shown on FIG. 4. The position of links (7) located at bottom edge of the link member (61) and right ink member (62) are adjusted by moving them to other suitable lock notches (65) according to the desired size. Alternatively, strap holder (3) can be repositioned by pulling out strip holder (3) from link (7) and selecting another proper lock notch (72) to meet the needed size. The newly adjusted scrubber strips (5) are still in an overlapped status. Thus, the length and size adjustment effectiveness of this wiper assembly is achieved. It's an efficient wiper mechanism that can meet varying size requirements.

Figure 5:
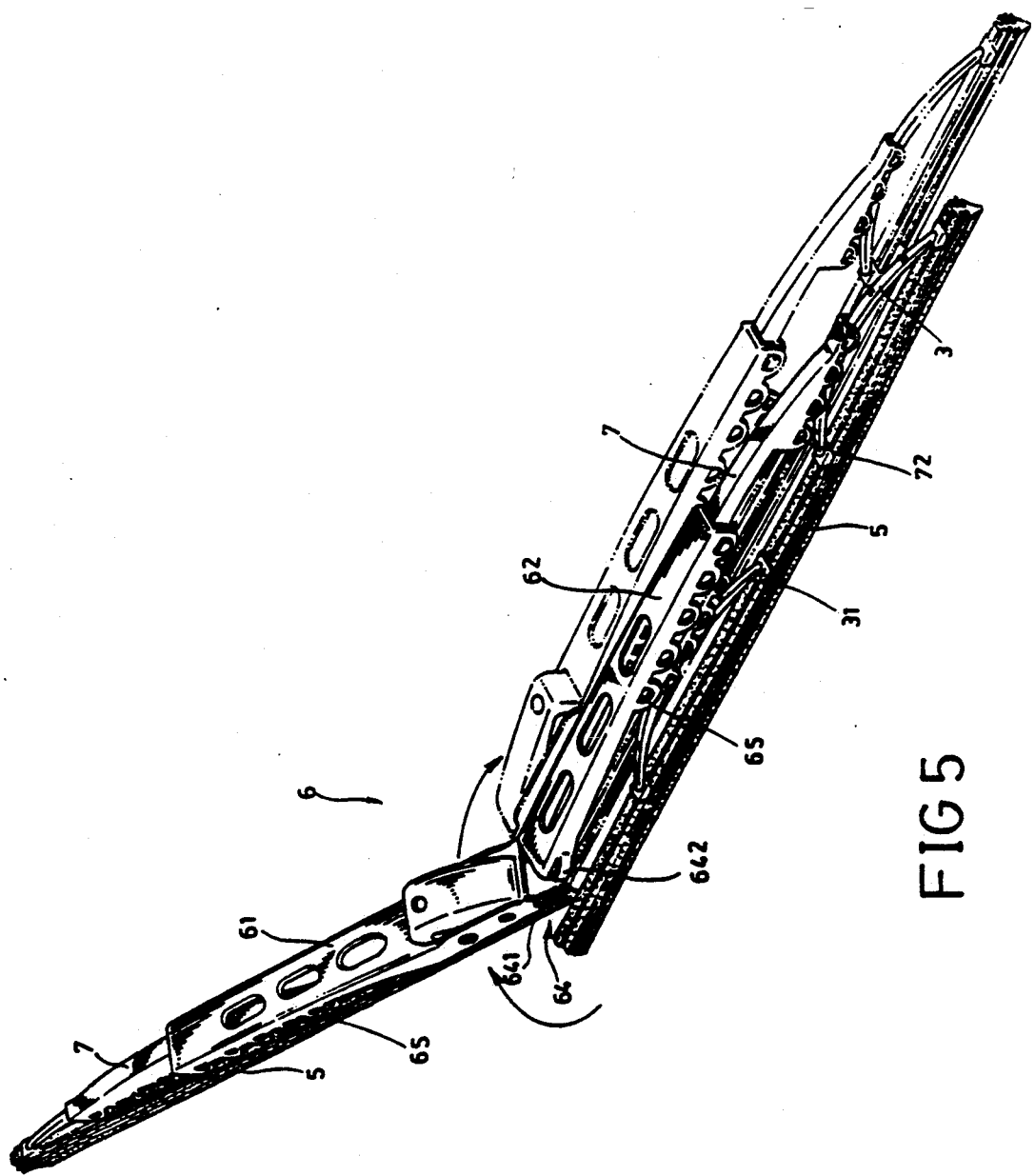
FIG. 5 is a perspective view of the wiper mechanism according to the present invention in a folded position.

The main member (6) of the wiper of this invention is purposely constructed by left link member (61) and right link member (62) is that female clip (642) of attachment (64) can be pulled out by a light force to unfasten it from clip (641) when they are not being used, as shown in on FIG. 5. The left link member (61) and right link member (62) can easily be folded to shorten the mechanism length when they're not being used. It's convenient for packing, transportation and storage purposes, and eliminates the inadequacy of the known mechanisms as being too slender. This present size adjustable structure improves the fixed size inconvenience and heavy cost burden occurred of known wiper structures and solves the known type of wiper structure's problems. We may conclude from aforementioned description that a primary purpose of this invention is to provide a better windshield wiper frame structure. Its engineered configuration allows the wiper frame to be folded to shorten the mechanism length and to adjust the wiper's scrubbing length. It can reduce the production cost of this device and fully develop its peculiar effectiveness in ease of packing.

A secondary purposes of this invention is to use the unique structure to allow the main member to be constructed of separate left link member and right link member and attach them together by a hinged fastener so that it can be folded to shorten its length when it is not used such as in storage and shipping.

An addition purpose of this invention is to utilize sets of lock notches arranged at a bottom edge of main member and the links so that strip holders can be attached to suitable lock notches located in the links, while the links can be attached to proper lock notches in the main member. Scrubber strips installed beneath the main member are overlapping after assembly of the device. The present structure doesn't affect the scrubbing and cleaning effect of the wiper and it allows adjustment of the size and length to fully develop its performance.

I claim:

1. An adjustable length windshield wiper structure comprising:
   a) a main frame member adapted to be attached to a wiper arm said main frame comprising:
      i) an elongated first ink member;
      ii) an elongated second link member;
      iii) hinge means pivotally connecting the first and second link members together so as to enable the first and second link members to be moved between a first position in which the first and second link members are generally collinear with each other and a second position wherein the first and second link members are generally parallel to each other; and,
      iv) releasable latch means operatively associated with the first and second link members to releasably latch them in their first position;
   b) first and second links;
   c) attachment means to attach the first and second links to the first and second link members, respectively, such that a position of at least one link is adjustable along the longitudinal length of at least one of the first and second link members;
   d) first and second wiper blades; and,
   e) mounting means to mount the first and second wiper blades on the first and second links respectively.

2. The adjustable length windshield wiper structure of claim 1 wherein the attachment means comprises means to adjustably attach the first and second links to the first and second link members such that positions of both first and second links are adjustable along a length of the main frame member.

3. The adjustable length windshield wiper structure of claim 1 wherein the mounting means for each wiper blade comprises:
   a) first and second strip holders adapted to hold a single wiper blade and,
   b) second attachment means to attach the first and second strip holders to the respective link such that the respective position of at least one of the first and second strip holders is adjustable along a length of a link.

4. The adjustable length windshield wiper structure of claim 3 wherein the second attachment means comprises means to adjustably attach the first and second strip holders to a link such that positions of both the first and second strip holders are adjustable along a length of the link.

* * * * *